May 10, 1960 R. W. SAUMSIEGLE 2,935,831
TUBE CLOSING AND SEALING APPARATUS
Filed April 19, 1955 5 Sheets-Sheet 1

INVENTOR.
ROBERT W. SAUMSIEGLE
BY
ATTORNEY

May 10, 1960 R. W. SAUMSIEGLE 2,935,831
TUBE CLOSING AND SEALING APPARATUS
Filed April 19, 1955 5 Sheets-Sheet 2

INVENTOR.
ROBERT W. SAUMSIEGLE
BY Walter J. Kreske
ATTORNEY

INVENTOR.
ROBERT W. SAUMSIEGLE
BY
ATTORNEY

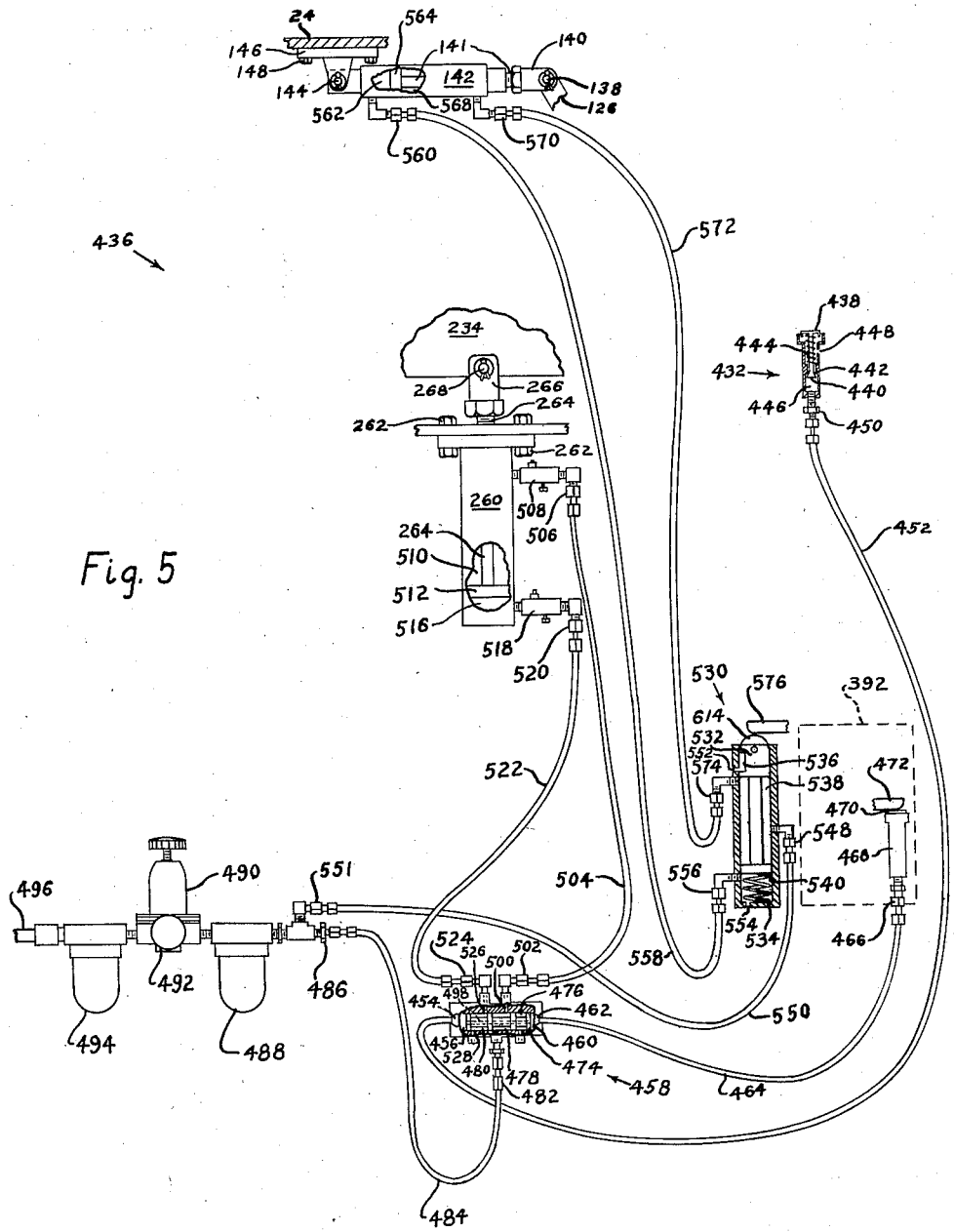

May 10, 1960  R. W. SAUMSIEGLE  2,935,831
TUBE CLOSING AND SEALING APPARATUS
Filed April 19, 1955  5 Sheets-Sheet 5

INVENTOR.
ROBERT W. SAUMSIEGLE
BY Walter J. Kreske
ATTORNEY

United States Patent Office 2,935,831
Patented May 10, 1960

2,935,831

TUBE CLOSING AND SEALING APPARATUS

Robert W. Saumsiegle, Lexington, Mass., assignor, by mesne assignments, to Pneumatic Scale Corporation, Limited, Quincy, Mass., a corporation of Delaware Application April 19, 1955, Serial No. 502,380

8 Claims. (Cl. 53—373)

This invention relates to machinery for rapidly closing and producing a leak tight seal at the filling ends of collapsible tubes made of thermoplastic material.

The feasibility of using thermoplastic materials such as polyethylene in collapsible tubes for the storage and dispensing of fluid products such as glue, tooth-paste, deodorants, and the like depends largely on the economy with which these tubes may be filled and closed at the filling ends with a leak-tight seal. The present invention is directed to this end and has as its primary object reliable low cost closing and sealing and collapsible thermoplastic tubes.

Another object of the invention is the provision of a machine which readily lends itself to production line operation in cooperation with automatic tube filling equipment and materials handling equipment as conveyors.

A further object is to provide a machine which is easily adaptable to a wide variety of tube sizes, both as to range in tube diameter and tube length, and variations in tube wall thickness.

A still further object is to provide a machine capable of simultaneously closing and sealing the filling ends of a multiplicity of tubes arranged in a bank or row to thereby effect a high, economical rate of output.

Another object is to provide a machine which is relatively simple to operate, minimizes operator fatigue and eliminates the human element in the quality of the seal produced.

Further objects are the production of a machine which is relatively inexpensive to manufacture, rugged in construction and reliable in its operation.

These and other features, objects and advantages of the present invention will become more apparent from the following description taken in connection with the accompanying drawings of a preferred embodiment of the invention wherein like numerals are used to designate like parts and wherein.

Figures 1, 2:
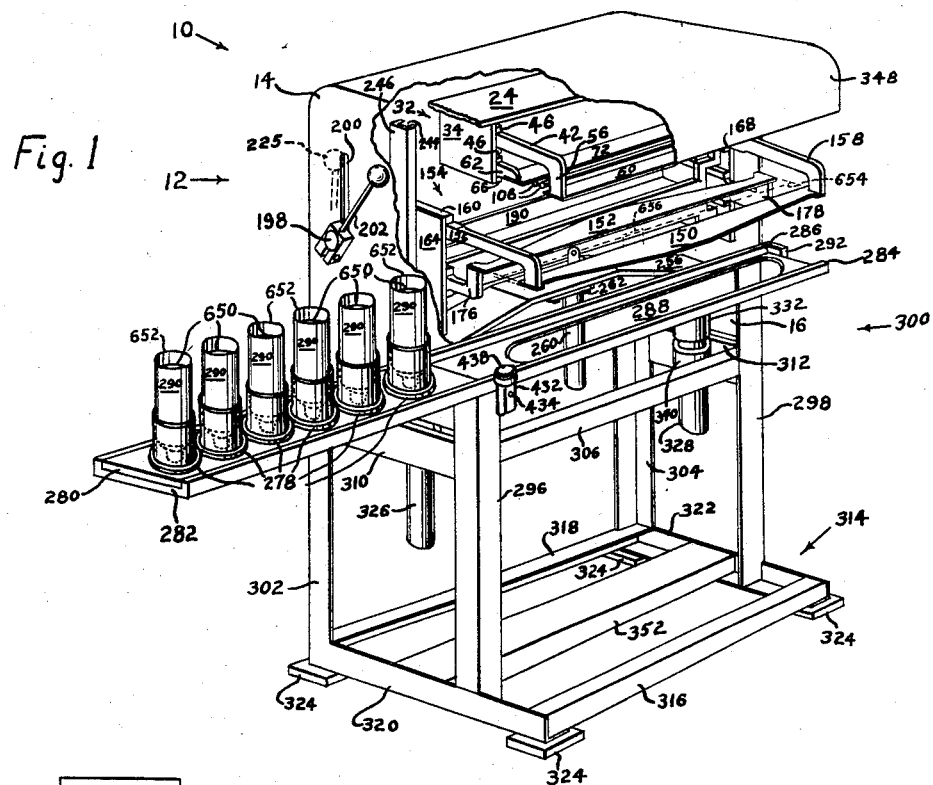
Fig. 1 is an isometric view with partially cut away sections and with some components not shown to more clearly show the general structural arrangement of the machine as a whole.
Fig. 2 is a schematic diagram of the electrical components and circuit arrangement used in the embodiment shown generally in Fig. 1.
Figure 3:
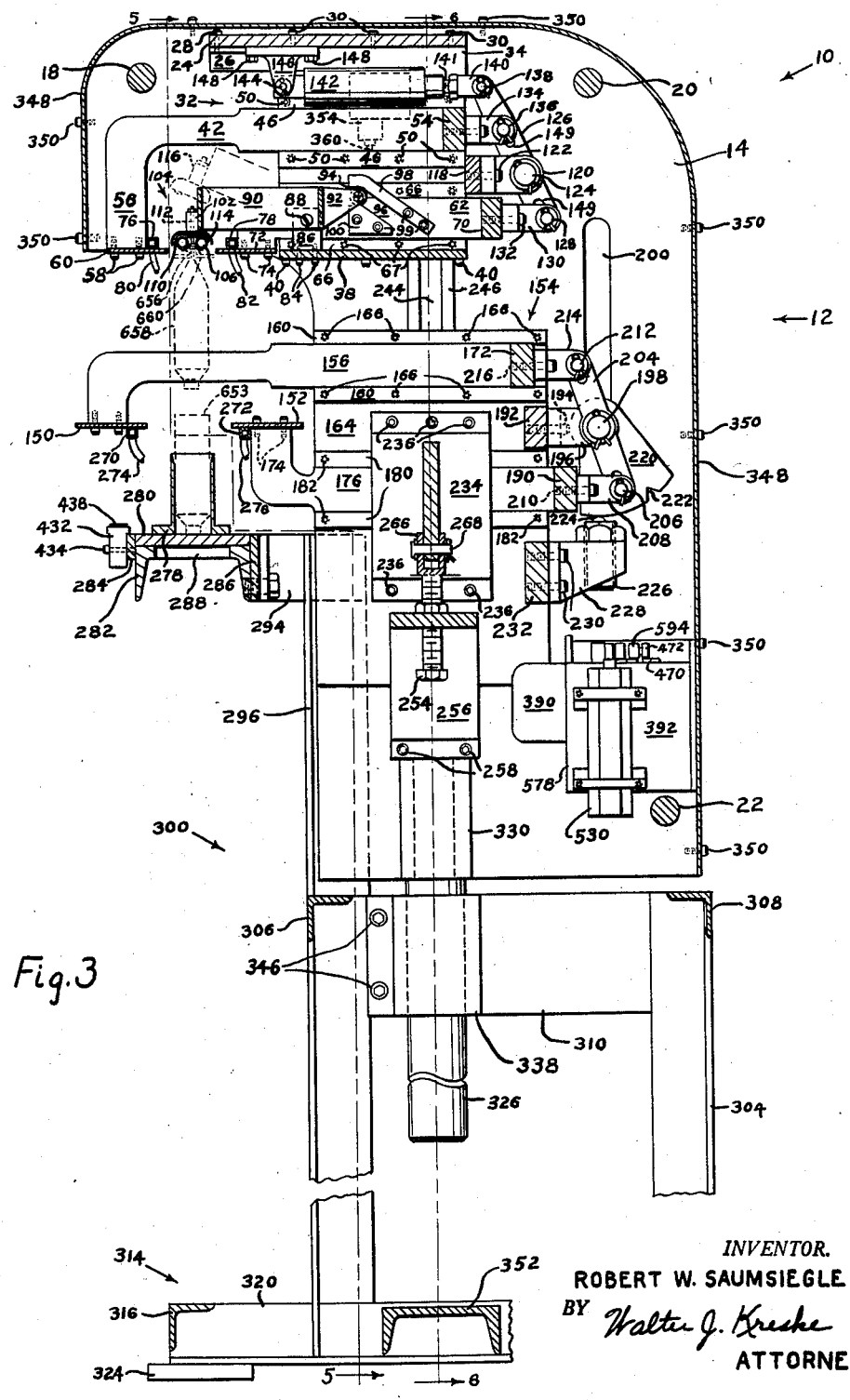
Fig. 3 is a cross sectional view of the machine shown generally in Fig. 1 and taken on line 3—3 of Fig. 4.
Figure 4:
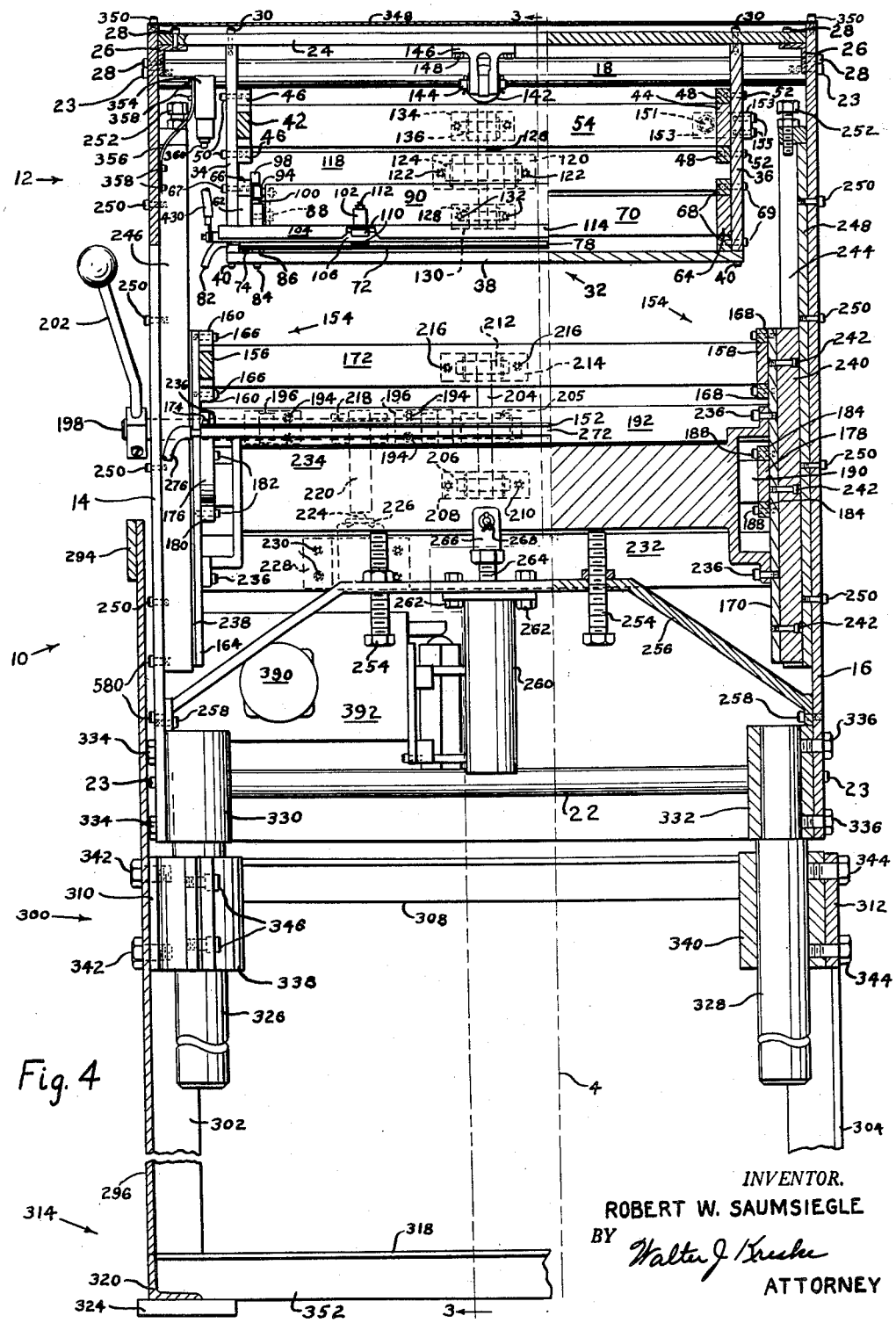
Figure 7:
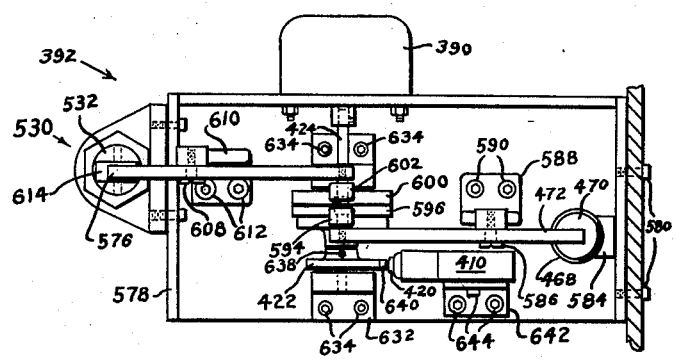
Figures 6, 8:
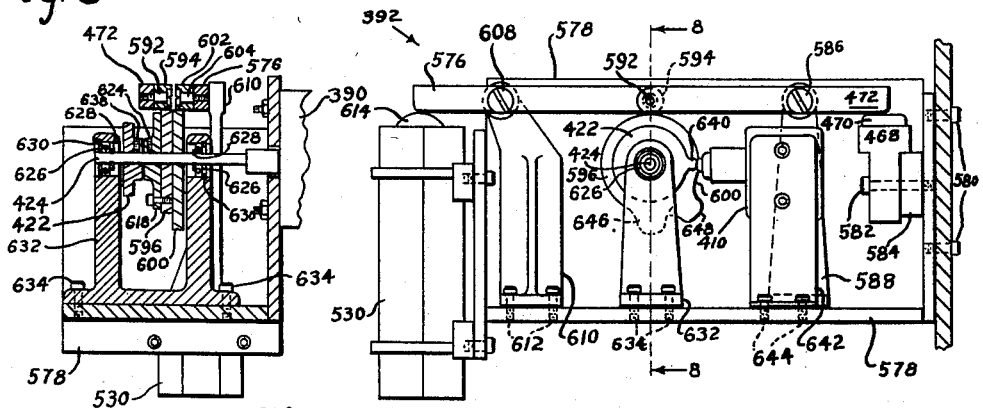
Figures 9, 10:
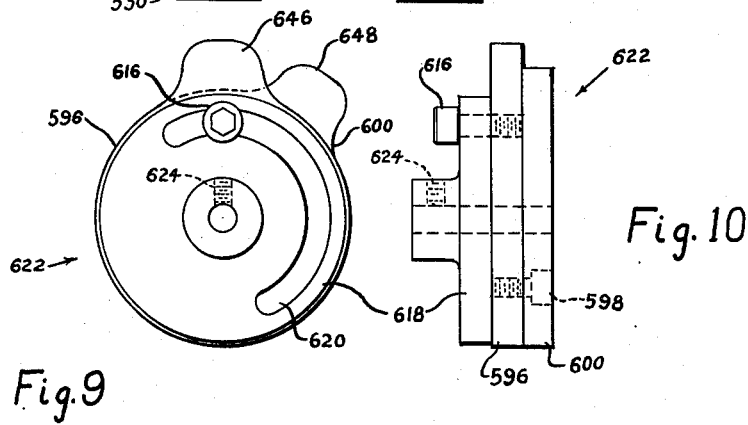

Fig. 4 is a cross sectional view of the machine shown generally in Fig. 1, with the portion of the left of line 4 being taken on line 5—5 of Fig. 3 and the portion to the right of line 4 being taken on line 6—6 of Fig. 3;

Fig. 5 is a diagram of the pneumatic system used in the embodiment shown generally in Fig. 1 and has cutaway portions in some components for schematic showing of operation thereof;

Fig. 6 is a view of the timing mechanism used in the embodiment shown generally in Fig. 1 as viewed from the back side of the Fig. 1 embodiment;

Fig. 7 is a top view of the timing mechanism shown in Fig. 6;

Fig. 8 is a cross sectional view of the timing mechanism taken on line 8—8 of Fig. 6;

Fig. 9 is a diagram to enlarged scale of timing cams used in the timing mechanism shown in Fig. 6;

Fig. 10 is a side elevation of the timing cams shown in Fig. 9.

Referring to the drawings in more detail, the machine as a whole is designated generally by the numeral 10 (Figs. 1, 3 and 4). The machine 10 has an upper frame structure 12 comprised of two oppositely disposed side panels 14 and 16 held rigidly in spaced relation to each other by circular spacer bars 18, 20 and 22 (Figs. 3 and 4) held in place by screws 23. Fixed between the top portions of the side panels 14 and 16 is a slide housing support plate 24 held by angle iron braces 26 (Figs. 3 and 4) and screws 28 at the support plate ends.

Fixed to the slide housing support plate 24 as by screws 30 and in depending relation thereto is an upper or sealing jaw slide housing 32 comprised of oppositely disposed, vertical slide support members 34 and 36 fastened at their upper ends to the slide housing support plate 24 by screws 30 and at their bottom ends to a spacer plate 38 by screws 40.

An upper pair of parallel slide arms 42 and 44 are mounted to slide horizontally in guide members 46 and 48. Guide members 46 and 48 are preferably made of a bearing material such as bronze. The guide members 46 may be suitably fastened to the slide support member 34 by screws 50 and the guide members 48 may be fastened to the support member 36 by screws 52. The rear ends of the upper slide arms 42 and 44 are fixed to a stiffener and actuating brace 54. The front ends of the slide arms 42 and 44 have downwardly depending extensions 56 to the bottom ends of which are fastened, as by screws 58, a horizontally disposed, elongated sealing or thermoplastic setting jaw 60 (Figs. 1 and 3).

A pair of lower slide arms 62 and 64 are similarly mounted to slide horizontally between guide members 66 and 68 respectively which may be similar to the guide members 46 and 48 and similarly fastened to the vertical slide support plates 34 and 36 by screws 67 and 69 respectively.

Slide arms 62 and 64 are fixed at their back ends to a stiffener and actuating brace 70 while the underside of the front ends are fixed to either end of a horizontally disposed, elongated, sealing or thermoplastic setting jaw 72 as by screws 74. The sealing or thermoplastic setting jaws 60 and 72 are disposed with their inside faces in parallel and opposite relation to each other and may be opened or closed by moving the actuator braces 54 and 70 in opposite directions. Each of the jaws 60 and 72 has in heat transmitting engagement therewith, as by brazing or soldering, metallic, heat conductive tubes 76 and 78 respectively for carrying a coolant fluid such as water for maintaining the jaws 60 and 72 at a desirable low thermoplastic setting temperature. The coolant fluid may be carried to and from the coolant tubes 76 and 78 by suitable extensions as rubber tubings 80 and 82.

Also fixed to either side of the spacer plate 38, as by screws 84, are a pair of pivot support blocks 86 (Figs. 3 and 4). Only the block 86 on the left hand side is shown in Figs. 3 and 4 since the block on the right hand side is identical in construction. Each of the pivot support blocks 86 has a pivot screw 88 fixed thereto for pivotally mounting a heater carrying bracket or frame 90. The heater carrying frame 90 has at one end an extension arm 92 to which is mounted a cam follower roller 94 constrained to move in a camming slot 96 formed between camming members 98 and 100 fixed to the slide arm 62 by screws 99.

Heater assembly carrying lugs 102 are fixed to the front end of the heater carrying frame 90, as by welding, and carry an elongated heater assembly 104 which is positioned between the sealing or setting jaws 60 and 72 when the jaws are in the open position shown in Figs. 1, 3 and 4. The heater assembly 104 is comprised of elongated, protective heater tubes 106 which house and protect electrical resistance heating elements 108 (Fig. 2). The heater tubes 106 are held in place by suitable clamps 110 (Fig. 3 and the cut-away section in Fig. 4) and a screw 112 running through the heater carrying lugs 102. The heater tube assembly 104 also includes a reflector 114.

It will be noted that when the slide arm 62 moves forward, the camming slot 96 cooperating with the fixed pivot 88 will cause the heater carrying frame 90 to rotate upwardly and thereby raise the heater tube assembly 104 to the position shown by the dotted lines 116 in Fig. 3.

An anchoring brace 118 is rigidly fixed at its ends to the back ends of the vertically disposed slide support members 34 and 36. The anchoring brace 118 has an anchoring yoke 120 fixed thereto as by screws 122 and extends rearwardly of the anchoring brace 118. The anchoring yoke 120 has pivotally mounted on a transverse pin 124 therein, an inclined lever arm 126 with its lower end pivotally fixed by a pivot pin 128 in a yoke member 130 to the stiffener and actuating brace 70 by screws 132.

A similar yoke member 134 is fixed to the stiffener and actuating brace 54 and is pivotally fixed by a pivot pin 136 to the arm 126, preferably the same distance above the anchoring pin 124 as the pivot pin 128 is below the anchoring pin 124. The top end of the lever arm 126 is pivotally fixed by a pivot pin 138 to a yoke 140 movably carried by the piston rod 141 of a pneumatic cylinder 142. The other end of the pneumatic cylinder 142 is anchored by a pivot pin 144 to an anchoring yoke 146 fixed to the slide housing support plate 24 by screws 148. Thus, when the yoke 140 is caused to move rearwardly by the pneumatic cylinder 142, the lever arm 126 will pivot on the fixed center 124 to draw the slide arm 42 rearwardly and push the slide arm 62 in a forward direction. To accommodate this movement of the lever arm 126, relief slots 149 are provided in the lever arm 126 for each of the pivot pins 128 and 136. By this movement, the sealing or setting jaws 60 and 72 will move toward each other and the camming groove 96 will cause the heater assembly 104 to move upwardly toward the dotted line position 116. The extent of this closing movement of the jaws 60 and 72 may be adjustably limited by the stop screw 151 (Fig. 4) which limits the outward movement of the actuator brace 54. The stop screw 151 is held in a stop bracket 153 fixed to the vertical support plate 36 by screws 155.

A second set of jaws 150 and 152, herein termed clamping jaws, are carried in vertical alignment beneath and parallel to the sealing or setting jaws 60 and 72 by a second set of arms slidably mounted in a lower or clamping slide housing 154. The clamping jaw 150 is mounted at its ends to the downwardly depending portions of a pair of parallel slide arms 156 and 158. The clamping slide arm 156 is constrained to slide horizontally between guide members 160 fixed to a vertical slide support plate 164 by screws 166. The clamping slide arm 158 is similarly constrained to slide horizontally by guide members 168 fixed by screws to a vertical support plate 170. A stiffener and actuating brace 172 is fixed at its ends to the back ends of the clamping slide arms 156 and 158 respectively.

The clamping jaw 152 is fixed by screws 174 to the upwardly directed front portions of a pair of oppositely disposed lower clamping slide arms 176 and 178. The slide arm 176 is constrained to slide horizontally between guide members 180 which may be similar to the guide member 160 and similarly fixed to the vertical support plate 164 by screws 182.

The clamping slide arm 178 is similarly constrained to slide horizontally between guide members 184 similar to guide member 180 and fastened to the support plate 170 by screws 188. The back ends of the lower clamping slide arms 176 and 178 are fixed to the ends of a stiffener and actuating brace 190.

An anchoring bar 192 is fixed at its ends to the vertical clamping slide support plates 164 and 170 and has fixed thereto by screws 194, a pair of anchoring brackets 196 in which is journaled for rotative movement therein a clamping slide operating rod 198. The rod 198 has one end extending horizontally through an elongated, vertical opening 200 in the side panel 14 where it is fixed to a clamping slide operating lever 202. The other end of the clamping slide operating rod 198 extends through an inclined clamping slide lever arm 204. The rod 198 provides a fixed pivotal center for the lever arm 204 which is rigidly fixed to the rod 198 by a set screw 205 (Fig. 4). The lower end of the clamping slide lever arm 204 is pivotally mounted by a pivot pin 206 to a clamping slide actuating yoke 208 extending rearwardly of the stiffener and actuating brace 190 to which it is fixed by screws 210.

The upper end of the clamping slide lever arm 204 is pivotally fixed by a pivot pin 212 to a clamping slide actuating yoke 214 extending rearwardly of the stiffener and actuating brace 172 to which it is fixed by screws 216.

Also fixed to the clamping slide operating rod 198, by a key 218 (Fig. 4), is a clamp locking cam 220. The locking cam 220 is in the form of the sector of a circle having a V type locking notch 222. Upon movement of the clamping slide operating lever 202 in a rearward direction to the position of the dotted lines 225 (Fig. 1), the clamping slide lever arm 204 causes the clamping slide arms to move the jaws 150 and 152 toward each other to a clamping position at which position the locking V notch 222 is aligned with a spring pressed ball or plunger 224 adjustably held in a screw housing 226 mounted in a bracket 228 which is fixed by screws 230 to the back side of an anchoring brace 232. The spring pressure on the ball 224 in the V groove 222 is sufficient to maintain the clamping jaws 150 and 152 in the desired fixed clamping position as determined by the relative setting of the lever arm 204 by the set screw 205 for operation as will hereinafter be more fully explained.

The vertical clamping slide support plates 164 and 170 are rigidly held in parallel spaced relation to each other by a support and elevator bar 234 which is fixed at its ends to the respective vertical support plate by screws 236.

The entire lower or clamping slide housing 154 is constrained to slide vertically. For this vertical movement, tongues 238 and 240 are fixed to the outside surfaces of the vertical support plates 164 and 170 respectively by screws 242 and are fitted to slide in vertically disposed slots or channels 244 in the channel segments 246 and 248. The channel segments 246 and 248 are fixed to the respective side panels 14 and 16 by screws 250.

The upwardly vertical movement of the clamping slide housing 154 is limited by adjustable stop screws 252 aligned with the respective tongue members 238 and 240. Downwardly vertical movement of the clamping slide housing 154 is limited by adjustable stop screws 254 (Figs. 3 and 4) vertically aligned with the support and elevator bar 234 and held in an elevating cylinder mounting bracket 256 which is fixed at its ends to the side panels 14 and 16 by screws 258.

A pneumatically operated elevating cylinder 260 is fixed at its flange by screws 262 to the underside of the mounting bracket 256 so that the piston rod 264 with its yoke 266 is in vertical alignment with the support and elevator bar 234 to which the yoke 266 is fixed by a pin 268. Thus, pneumatic actuation of the piston rod 264 will be transmitted through the support and elevator bar 234 to the entire clamping slide housing 154.

The clamping jaws 150 and 152 have tubes 270 and 272, similar to tubes 76 and 78, fixed in heat transmitting engagement therewith. The tubes 270 and 272 have suitable tube extensions 274 and 276 on their ends for circulating therethrough a suitable coolant fluid such as water from a source (not shown).

Centrally located beneath the clamping jaws 150 and 152 is a row or bank of tube holders 278 fixed at their bases, as by welding or other suitable means, to the top of a slide member 280. The slide member 280 is mounted to slide longitudinally of the clamping jaws 150 and 152 on a table 282 between guides 284 and 286. The table 282 has an elongated opening 288 having a width slightly larger than the largest container diameter to be processed by the machine 10 for purposes as will hereinafter be more fully described. Thus, tubes 290 held in the tube holders 278 may be moved to a clamping position or station between the clamping jaws 150 and 152 from a filling position or station shown in Fig. 1. This shift in position is effected by the simple expedient of moving the slide member 280 to the right until it reaches a stop 292. In this clamping station, the tubes 290 may be clamped between the jaws 150 and 152 and raised out of the containers 278 to free the containers 278 for a new set of tubes while further processing is carried on by the machine 10 on the previous set of tubes as will be further described. The tubes 290 so carried in the jaws 150 and 152 may then be ejected from the machine 10 by dropping through the opening 288 onto a suitable conveyor belt or other receiving means (not shown) in production line operation.

The table 282 is fixed by brackets 294 (Fig. 3) to upright members 296 and 298. The upright members 296 and 298 constitute part of a front portion of a lower frame structure 300 for adjustably carrying the upper frame structure 12.

A suitable construction for the lower frame structure 300 may consist of four vertical angle iron support members, the front ones of which are the above mentioned members 296 and 298, and additionally two rear upright angle iron members 302 and 304. The upper portions of the upright angle iron members 296, 298, 302 and 304 are held in place by horizontally disposed angle iron braces 306 and 308 rigidly fixed to the upright members 296, 298 and 302, 304 respectively, and by side panel braces 310 and 312. All of these braces may be rigidly fixed in place by welding. The bottom ends of the upright members 296, 298, 302 and 304 are welded in place on a base framework 314. The base framework 314 is comprised of angle iron members 316, 318, 320 and 322 welded together at their ends and resting on load dispersing pads 324 fixed to the base framework 314.

A pair of height adjusting rods 326 and 328, each having reduced upper neck portions are rigidly held at these reduced neck portions in sleeves 330 and 332 respectively. Sleeve 330 is fixed to the side panel 14 by screws 334 and the sleeve 332 is fixed to the side panel 16 by screws 336. The lower body portions of the height adjusting rods 326 and 328 are firmly clamped in split sleeve brackets 338 and 340 respectively. The bracket 338 is fixed to the panel brace 310 by screws 342. The bracket 340 is fixed to the panel brace 312 by screws 344. Each of the split sleeve brackets 338 and 340 are provided with clamping screws 346 which upon being loosened permit the height adjusting rods 326 and 328 to slide in the brackets 338 and 340 for vertical adjustment of the entire frame structure 12 with respect to the lower frame structure 300. After such adjustment has been made, the screws 346 are tightened to lock the height adjusting rods 326 and 328 and thereby the upper frame structure 12 in place.

To assist in the raising and lowering of the weight of the upper frame structure 12, a channel section 352 is provided in the base framework 314 and fixed at its ends to the angle iron braces 320 and 322. The channel section 352 is placed beneath and in line with the height adjusting rods 326 and 328. By this arrangement, a leverage amplifying device such as a hydraulic jack (not shown) may be rested on the channel section 352 and braced against the bottom ends of the height adjusting rods 326 and 328 to provide easy and rapid height adjustment of the upper frame structure 12 regardless of the considerable weight involved.

The upper frame structure 12 may be suitably covered by a sheet metal covering 348 held in place on the peripheral edges of the oppositely disposed side panels 14 and 16 by screws 350.

A normally open electric switch 354 is fixed by a bracket 356 and screws 358 to the side panel 14. The normally open electric switch 354 is placed with its switching rod 360 in the path of the upper end or surface of the guide member 160 (Figs. 3 and 4) so as to be actuated by the guide member 160 on movement of the lower or clamping slide housing 154 upwardly as hereinabove described.

The electric switch 354 is schematically shown in Fig. 2 and is one of the components in the electric circuit arrangement 355 in the machine 10. The switching rod 360 of the switch 354 is fixed through an insulator 362 to a contactor 364 for making and breaking the circuit between terminals 366 and 368. The contactor 366 will normally be held in the open circuit position with respect to the terminals 366 and 368 by the switching rod 360 because of the compression spring 370. The terminal 368 of the electric switch 354 is connected through an electric power line 372 to a terminal 374 in a terminal box 376. The terminal 374 is connected through an electric power line 378 and a fuse 380 to a line 382 leading to one side of an alternating current power source such as a standard commercial sixty cycle power source. The other terminal 366 in the switch 354 is connected through an electric power line 384 to a terminal 386 in the terminal box 376. The terminal 386 is also connected through an electric power line 388 to an electric gear motor 390 in a timer mechanism 392 which will be hereinafter described.

In the present instance, the alternating current power source used being single phase, the gear motor 390 is of the capacitor type for improved starting torque and operating characteristics on single phase power. Therefore, a capacitor 394 is connected from line 388 to a second terminal in the gear motor 390.

A third terminal on the gear motor 390 is connected through an electric power line 396 to a third terminal 398 in the terminal box 376. The terminal 398 is connected through an electric power line 400, a fuse 402 and a line 404 to the other side of the alternating current power source.

The terminal 374 in the terminal box 376 is also connected through an electric power line 406 to a terminal 408 in a second electric switch 410 shown schematically in Fig. 2. Another terminal 412 in the electric switch 410 is connected through an electric power line 414 to the terminal 386 in the terminal box 376. A contactor in the switch 410 is actuated through a switching rod 420 to which it is connected through an insulator 418. The contactor 416 is normally held in open circuit with the terminals 408 and 412 by an electric timing cam 422 on an operating shaft 424 driven by the gear motor 390. In the open circuit condition, the compression spring 426 is compressed so that it will cause the switching rod 420 to move the contactor 416 to make circuit with the terminals 408 and 412 upon release of pressure by the cam 422.

The electrical circuit arrangement 355 in the machine 10 also includes an electric power line 428 connected from one side of each of the heating resistor elements 108 through the fuse 380 to the line 382. The other side of each of the heating resistor elements 108 is connected through an electric power line 430 and the fuse 402 to the line 404.

A manually operated air valve 432 is fixed to the guide 284 of the table 282 by a screw 434 (Figs. 1 and 3). The manually operated valve 432 is shown schematically in cross section in Fig. 5 as one of the components in a pneumatic actuating system 436 used in the machine 10. The manually operated valve 432 has a plunger 438 having a flared portion 440 at one end which is held tightly against a shoulder 442 by a compression spring 444 to normally provide an air tight seal between an air chamber 446 and an escape orifice 448. By depressing the plunger 438, the flared portion 440 is moved away from the shoulder 442 to provide passage for air from the chamber 446 through the escape orifice 448.

The manually operated valve 432 has its chamber 446 connected through coupler fittings 450, an air tube 452 and coupler fittings 454 to an air chamber 456 in one end of a pneumatic valve shown schematically as valve 458.

The valve 458 has another chamber 460 at its opposite end connected through coupler 462, air tube 464 and coupler fittings 466 to an air valve 468. The valve 468 may be identical to the valve 432 and coupler fittings 466 connected in the same manner as the coupler fittings 450. The valve 468 has a plunger 470 for providing air escapement when depressed by an operating lever 472 in the timing mechanism 392 which will be hereinafter more fully described.

The valve 458 has slidably arranged therein a valve cylinder 474 at either end of which are the chambers 456 and 460. The valve cylinder 474 has cut away sections defining three other chambers 476, 478 and 480. The chamber 478 is connected through coupler fittings 482, an air tube 484, coupler fittings 486, an oiler 488, a pressure control valve 490 with pressure indicator 492 and filter 494 to an air line 496 leading to a high pressure air supply source (not shown).

The pressure in the chamber 478 will, therefore, be at that set on the valve 490. The chamber 478 also has passages 498 through the valve cylinder 474 communicating with the chambers 456 and 460. Thus, when the valves 432 and 468 are closed, the pressure in the chambers 478, 456 and 460 will be substantially the same.

The valve 458 has its high pressure chamber 478 normally connected through a passage 500, coupler fittings 502, air tube 504, coupler fittings 506, air flow controller 508 to a chamber 510 in the pneumatically operated elevating cylinder 260. The air chamber 510 is above a piston 512 fixed to the piston rod 264. The normally high pressure from chamber 478 will exist in chamber 510 causing the piston 512 to remain in its down position shown in Fig. 5. The upper frame structure 12 will, therefore, normally remain down against the stop screws 254. A chamber 516 on the other side of the piston 512 is connected through an air flow controller 518, coupler fittings 520, air tube 522, coupler fittings 524 and passage 526 to the chamber 480 which is normally opened to the atmosphere through a passage 528. The passage 528 maintains the chamber 480 at a pressure lower than that in the chamber 478.

Similarly a passage 530 opening to the chamber 476 maintains the chamber 476 at a pressure lower than that in the chamber 478. When the plunger 438 in the manually operated valve 432 is depressed, the escape of air through the orifice 448 causes the pressure in the chamber 456 to drop below that in chamber 460. Thus the valve cylinder 474 will move to the left. When the valve cylinder 474 moves to the left, the passage 526 leading to chamber 516 in the pneumatic elevating cylinder 260 becomes aligned with the high pressure chamber 478. At the same time the passage 500 leading to the chamber 510 in the elevating cylinder 460 becomes aligned with the low pressure chamber 476. Thus the piston 512 will be forced upward so as to lift the upper frame structure 12 against the stop screws 252.

When the plunger 470 of the valve 468 is depressed, the valve cylinder 474 will again move to the right to realign the passages and chambers to that shown in the diagram in Fig. 5 and thereby return the upper frame structure 12 to its original position on the stop screws 254.

Another operating air valve is shown schematically as valve 530 with a valve cylinder 532 slidably mounted therein and normally maintained in the position shown by a compression spring 534 at its bottom end forcing it upwardly. The valve cylinder 532 defines three chambers 536, 538 and 540. The chamber 538 is connected through coupler fittings 548, air tube 550, coupler fittings 551 to the coupler fittings 486. Thereby, the pressure as set in the regulator valve 490 is normally maintained in the valve chamber 538. On the other hand, the chamber 536 is opened to the atmosphere by a passage 552 and the chamber 540 is opened to the atmosphere by a passage 554. Thus, the chambers 536 and 540 are maintained at a lower pressure than that in the chamber 538.

The low pressure chamber 540 is connected through coupler fittings 556, air tube 558, coupler fittings 560 to an air cylinder chamber 562 on the left side of a piston 564 which is fixed by the piston rod 141 to the yoke 140 of the pneumatic cylinder 142.

Another air cylinder chamber 568 on the other side of the piston 564 is connected through coupling fittings 570, an air tube 572 and coupler fittings 574 to the high pressure chamber 538. Thus, the high pressure in the air cylinder chamber 568 will normally keep the piston 564 retracted the maximum distance as shown in Fig. 5. When the valve cylinder 532 is depressed by a lever arm 576 in the timing mechanism 392, the low pressure chamber 536 will be aligned with the coupler fittings 574. On the other hand, the high pressure chamber 538 will become aligned with the coupler fittings 556, thereby, producing a higher pressure in the air cylinder chamber 562 than in the air cylinder chamber 568. This causes the piston 564 to be pushed to the right and to rotate the lever arm 126 to the right about the pivot pin 124.

When the lever 576 in the timing mechanism 392 releases the valve cylinder 532, the valve cylinder 532 will be pushed back to its position shown in Fig. 5 by the spring 534 so as to realign the pressure chambers to that shown in Fig. 5. This realignment again causes the air pressure in chamber 568 of the air cylinder 142 to be higher than that in the air cylinder chamber 562. Thus, the piston 564 and thereby the lever arm 126 will be moved back to its original position shown in Fig. 5.

The timing mechanism 392 includes a timing mechanism box or housing 578 which is fastened on one side to the side panel 14 by screws 580. To this side is also fastened the air valve 468 by a screw 582 and spacer block 584. The lever arm 472 which has one end in operative engagement with the plunger 470 of the air valve 468 is pivotally mounted by a screw 586 to a bracket 588 fastened to the floor timing mechanism housing 578 by screws 590. The other end of the lever arm 472 has rotatively fixed thereto by a screw 592 a cam follower roller 594 riding on an elevator timing cam 596.

The elevator timing cam 596 is fixed by a screw 598 to a sealing or setting jaw timing cam 600. Another cam follower roller 602 is rotatively fixed by a screw 604 to one end of the lever arm 576 which is pivotally mounted by a screw 608 to a bracket 610 fixed to the floor of the housing 578 by screws 612. The other end of the lever arm 576 operatively engages a wheel 614 connected to the valve cylinder 532. The cams 596 and 600 which are fastened together by the screw 598 as shown in Fig. 10 are both adjustably fastened by a screw 616 to a flange 618 having an arcuate adjusting slot 620 and together form a timing cam assembly 622.

The timing cam assembly 622 is mounted on the shaft 424 and fastened thereto by a set screw 624 running radially of the flange 618. The shaft 424 is mounted to rotate in anti-friction bearings 626 held in place by retaining rings. The retaining rings 628 are on the shaft 424 and the retaining rings 630 are in an accommodating opening in the legs of a U-shaped bracket 632 fastened to the floor of the housing 578 by screws 634.

An electric circuit timing cam 422 is also carried by and fastened to the shaft 424 by a set screw 638. The electric circuit timing cam 422 has a peripheral projection 640 for operatively engaging the switching rod 420 in the electric switch 410. The electric switch 410 is mounted by a bracket 642 and screws 644 to the floor of the timing mechanism housing 578.

The cam 596 has a camming lobe 646 for driving the cam follower 594 upwardly so that lever 472 will pivot about the screw 586 to depress the plunger 470 in the valve 468. Similarly, the cam 600 has a camming lobe 648 for forcing the cam follower roller 602 upwardly to cause the lever 576 to pivot on the screw 608 and thereby depress the wheel 614 and valve cylinder 532 in the valve 530.

In operation, a row of tubes 290 filled with the desired contents 650 as liquid solder to a height well below the free or filling ends 652 of the tubes 290 are held in the tube holders 278. For closing and sealing the tubes 290 by the machine 10, the slide member 280 is manually pushed to the right on the table 282 until it is stopped by the stop member 292. Tube holders and tubes will then be in a position between the clamping jaws 150 and 152 as shown in Fig. 3 with the free or filling ends 652 of the tubes extending somewhat above the clamping jaws 150 and 152 as shown by the dotted lines 653 in Fig. 3. The clamping jaw operating lever 202 is then manually rotated to the position shown by the dotted lines 225 in Fig. 1. This rearward movement of lever 202 causes the clamping slide operating rod 198 to rotate in the same direction and carry with it the clamping slide lever arm 204 and locking cam 220. This rotation of the clamping slide lever arm 204 causes the clamping jaws 150 and 152 to close as shown by the dotted lines 654 in Fig. 1. The closing will be against the sides of the tubes 290 below the filling ends 652 so as to leave a small portion of the free edges 652 of the tubes 290 extending above the closed clamping jaws 150 and 152 as shown by the dotted lines 656 in Fig. 1. To insure a substantially equal closing pressure against all of the tubes 290, the clamping jaws 150 and 152 are preferably made with a tapered construction (see Fig. 1) wherein the center portions are wider than the end sections so as to minimize variations in deflection and stress over the length of the clamping jaws.

The clamping jaws 150 and 152 having been brought against the sides of the tubes 290 in the clamping position as explained, are maintained in this clamping position by the ball 224 in the locking V slot 222 of the locking cam 220.

The plunger 438 of the air valve 432 is then manually depressed and causes the pneumatically operated elevating cylinder 260 through its yoke 266 to lift the upper frame structure 12 with the tubes 290 clamped therein, upwardly against the stop screws 252. In this upward or heating position, the tubes 290 will appear as shown by the dotted lines 658 in Fig. 3. Free ends shown by the dotted lines 656 will be held in heating relation with the elongated heater tubes 106. Also, this upward movement of the clamping slide housing 154 causes the electric switch 354 to make circuit with the terminals 366 and 368 to start the timing gear motor 390 in the timing mechanism 392.

The starting of the timing gear motor 390 causes the camming lobe 640 on the electrical timing cam 422 to release the switching rod 420 in the switch 410 to thereby complete the circuit between terminals 408 and 412. Thus, the gear motor 390 will continue to operate by means of switch 410 even though the circuit between the terminals 366 and 368 at the electric switch 354 may be broken.

The timing cam 600 is clamped to the flange 618 and set by means of slot 620 to such a position that after sufficient time has elapsed to make the ends 656 of the tubes 290 molten by the heat from the heater tubes 106, the timing cam lobe 648 will reach the cam follower 602. This will cause the air valve wheel 214 to be depressed so as to actuate the air cylinder 142 and move the setting jaw lever arm 126 rearwardly. Rearward movement of the lever arm 126 causes the heater assembly 104 to be lifted out of heating relation with the tube ends 656 and toward the position shown by the dotted lines 116 as previously explained.

The rearward movement of lever arm 126 also causes the sealing jaws 60 and 72 to move forward against the molten and protruding free ends 656 of the tubes 290 as shown by the dotted lines 660 in Fig. 3. Because of the setting of the adjustable stop screw 151, the sealing or setting jaws 60 and 72 will come pressurably against the free ends 656 of the tubes 290 but will be retained a slight distance apart to prevent pinching off these ends 656 of the tubes 290 which now have little resistance to pressure because of their molten condition. The cooling effect of the setting jaws 60 and 72 will cause an immediate hardening of the molten edges 656 of the tubes 290 which have now become fused together to form a leak-tight seal.

The time required for the setting jaws 60 and 72 to be held in the closed sealing or setting position is short and continues for only the duration of the flat portion on the cam lobe 648. As the cam lobe 648 passes the cam follower roller 602, the lever 576 releases the valve wheel 614 and causes the jaws 60 and 72 to move back toward the open position. As the setting jaws 60 and 72 move toward the open position, the other cam lobe 646 comes into play moving the cam follower roller 594 upwardly so as to cause the lever arm 472 to depress the plunger 470 in the pneumatic valve 468. With the plunger 470 being depressed, the elevating cylinder 260 is thereby actuated to return the clamping slide housing 154 to its normal position against the stop screws 254. In this downward movement of the clamping slide housing 154, it will be noted that the switching rod 360 on the electric switch 354 is released so as to break the circuit between the terminals 366 and 368. However, as explained above, the gear motor 390 will still continue to run because of the circuit existing between the terminals 408 and 412 in the electric switch 410.

With the return of the clamping slide assembly 154 toward its normal position, the clamping jaws 150 and 152 will continue to hold the tubes 290 until released by bringing the operating lever 202 back to the forward position so as to cause the clamping jaws 150 and 152 to open.

Previous to the opening of the clamping jaws 150 and 152, in fact while the protruding ends 656 were being made molten in the heating position explained above, the slide member 280 is manually returned to the filling station or position shown in Fig. 1. While the machine 10 is automatically processing the tubes 290 as just described, a new row of tubes are inserted into the tube holders 278 and filled with the desired contents in preparation for a succeeding closing and sealing cycle as explained above.

As soon as the operating lever 202 is again pulled to the forward position, the clamping jaws 150 and 152 open and release the closed and sealed tubes 290. The tubes 290 thereupon fall through the opening 280 onto a suitable conveyor belt or other materials handling arrangement (not shown) beneath the table 282, thus rapidly freeing the machine 10 for a new closing and sealing cycle.

After the cam lobe 646 has actuated the pneumatic valve 468 as explained above, the operating shaft 424 will continue to be rotated by the gear motor 390 until the cam lobe 640 on the electrical timing cam 422 again depresses the switching rod 420 in the electric switch 410 so as to again break the circuit between the terminals 408 and 412. At that instant the gear motor 390 will stop and remain in position for the repetition of another closing and sealing cycle as explained above.

In the present embodiment, the gear ratio in the gear motor 390 is such that a two minute cycle is required for a complete revolution of the shaft 424. But other timing speeds may also be used where suitable.

It will be noted that the cyclic operation of the present embodiment is such that the tube holders 278 are released for refilling while the machine 10 is processing a previous row of tubes. There is substantially no down time in the machine operation and maximum output efficiency is achieved.

It should be understood that this invention is not limited to the specific arrangement and structure shown as equivalents will suggest themselves to those skilled in the art.

What I claim is:

1. A machine for closing and sealing the open ends of container tubes made of flexible thermoplastic material, said machine comprising a support, a rack on said support for carrying a row of tubes, means disposed to move on opposite sides of the tubes for simultaneously clamping together the opposite sides of the tubes in said row along a narrow area spaced from said ends, radiant heat emitting means spaced from said ends for simultaneously causing the tube material between said ends and clamped areas of the tubes in said row to become sticky, rigid thermoplastic setting means associated with said clamping means operative to simultaneously press said sticky portions of the tubes in said row into coalescing contact, and means in responsive relation to said setting means for dissociating said heat emitting means from said ends during said coalescing contact.

2. A machine for closing and sealing the filling ends of container tubes made of flexible thermoplastic material, said machine comprising a support, a rack for carrying a row of tubes with the filling ends uppermost, said rack being mounted on said support for movement between a filling and a clamping position, means disposed to move on opposite sides of the tubes at said clamping position for simultaneously clamping together opposite sides of the tubes in said row so as to flatten the tube along a narrow area spaced from said ends, heat emitting radiant means spaced from said ends for simultaneously causing the tube material between said ends and clamped areas of the tubes in said row to become sticky, rigid thermoplastic setting means associated with said clamping means operative to simultaneously press said sticky portions of the tubes in said row into coalescing contact, and means in responsive relation to said setting means for dissociating said heat emitting means from said ends during said coalescing contact.

3. A machine for closing and sealing the open ends of container tubes made of thermoplastic material, said machine comprising a pair of oppositely disposed elongated jaws having narrow clamping edges, a support beneath said jaws, a rack on said support for carrying a row of tubes with the open ends between said jaws, means engaging the jaws for pressurably closing said jaws against opposite sides of said row of tubes with free ends of said tubes protruding above said jaws, an elongated heating element on the protruding end side of the jaws for making said row of tube ends molten, a second pair of elongated jaws on the protruding end side of said first mentioned jaws, means engaging the second pair of jaws for pressurably closing the second pair of jaws against opposite sides of the row of protruding molten tube ends, and means cooperating with said last mentioned means for disassociating the heating element and molten tube ends during the closing of said second pair of jaws.

4. A machine for closing and sealing the open ends of container tubes made of thermoplastic material, said machine comprising a pair of oppositely disposed elongated jaws having narrow clamping edges, a support beneath said jaws, a rack movable on said support for carrying a row of tubes with the open ends between said jaws, means engaging the jaws for pressurably closing said jaws at diametrically opposite points adjacent the open ends of said row of tubes with free ends of said tubes protruding above said jaws, an elongated heating element above said jaws, means for raising said closed jaws to a position adjacent said heating element to cause the protruding ends of said row of clamped tubes to become tacky, a second pair of elongated jaws, means engaging the second pair of jaws for pressurably closing said second pair of jaws against opposite sides of the protruding tacky ends of said tubes, and automatic power means in responsive relation to said raising means for operating said last mentioned means.

5. An apparatus for closing and sealing the filling ends of container tubes made of thermoplastic material, said apparatus comprising, two pairs of oppositely disposed elongated jaws positioned in parallel relation to each other to operate in horizontal planes one above the other, a slide beneath the lower of said pairs of jaws, a rack on said slide adapted for movement of a row of tubes with the filling ends uppermost between said lower jaws, means for pressurably closing said lower jaws against opposite sides of and adjacent to the open filling ends of said row of tubes so as to flatten the tubes along a narrow margin adjacent said ends with adjoining edges of said tubes protruding above said jaws, an elongated heating element at said upper jaws, means for raising said lower jaws a distance sufficient to remove said tubes from said rack and to a position adjacent said heating element for radiantly heating the protruding edges of said tubes to a tacky condition, means for pressurably closing the upper pair of jaws to compress said protruding edges made tacky by said heating element to thereby cause a leak-tight seal, means cooperating with said last mentioned means for moving said heating element away from said protruding edges during the closing of said upper pair of jaws, and automatic power means in responsive relation to said raising means for operating the means for closing the upper pair of jaws.

6. A collapsible tube closing and sealing apparatus for tubes made of thermoplastic material comprising a rack for holding a row of tubes, two sets of reciprocable members extending to opposite sides of the row of tubes, a narrow edged jaw supported on the members of each set to form two pairs of clamping jaws with one pair above the other pair, a heater at the upper pair of jaws, the lower pair of jaws being positioned to close against said opposite sides of the row of tubes to thereby flatten and close the filling ends of the tubes with free ends of the tubes protruding above the jaws, means for raising the reciprocable members supporting the lower jaws to a heating relation between said heater and free ends for thereby causing the ends to become molten, and means engaging the reciprocable members for closing the upper jaws on the molten ends of the row of tubes to form a leak-tight seal at the filling end of each of the tubes in the row.

7. A collapsible tube closing and sealing apparatus for tubes of thermoplastic material comprising a row of tube holders adapted for movement between a filling and a clamping station, a first slide housing adapted for movement vertically between a tube heating and the tube clamping stations, a pair of reciprocable slide assemblies in the slide housing, a narrow edged jaw on each side of the row of tubes in the clamping station, each of said jaws supported by one of the slide assemblies of the pair, a second slide housing, a second pair of reciprocable slide assemblies in said second housing, two oppositely disposed jaws, each supported by one of the slide assemblies of the pair in the second slide housing, a heater at said heating station, and means operatively engaging said slide assemblies and heater for effecting a clamping, heating and setting cycles in the order named on the entire row as a unit.

8. A collapsible tube closing and sealing apparatus for the filling ends of tubes of polyethylene material comprising a row of tube holders adapted for movement of a row of tubes with filling ends uppermost between a filling and a clamping station, a vertically movable and a stationary slide housing above the clamping station, the vertically movable slide housing adapted for movement between the clamping station and a heating station above said clamping station, a pair of reciprocable slide assemblies in each of the slide housings, a narrow edged jaw supported by each of the slide assemblies to form two pairs of jaws with one jaw of each pair above the other on opposite sides of the row of tubes in the clamping station, the stationary housing jaws being above the movable housing jaws, a jaw opening and closing lever for each of the pairs of slide assemblies, each of said levers pivotally mounted to the respective slide assembly and fixed to pivot at a point between the slide assemblies of the respective pair, manual means for rotating the lever of said movable housing to a clamping position of said movable housing jaws against the opposite sides of the tubes and adjacent the filling ends, yieldable spring means engaging said manual means for holding said movable housing jaws in place, a heater at said heating station positioned for heating the filling ends of the row of tubes, power means for moving said movable housing vertically to said heating station, power means for rotating the lever at said stationary housing to a setting position of said stationary housing jaws against the opposite sides of the heated filling ends of said row of tubes, and a control timer actuated by said movable housing for actuating said power means for rotating the lever after a predetermined heating interval.

References Cited in the file of this patent

UNITED STATES PATENTS

| | | |
|---|---|---|
| 2,114,624 | Bergstein | Apr. 19, 1938 |
| 2,449,478 | Herzog | Sept. 14, 1948 |
| 2,568,794 | Dieter | Sept. 25, 1951 |
| 2,676,444 | Gaubert | Apr. 27, 1954 |
| 2,691,474 | Olson | Oct. 12, 1954 |

UNITED STATES PATENT OFFICE

CERTIFICATE OF CORRECTION

Patent No. 2,935,831       May 10, 1960

Robert W. Saumsiegle

It is hereby certified that error appears in the above numbered patent requiring correction and that the said Letters Patent should read as corrected below.

In the grant, lines 3 and 4, and in the heading to the printed specification, line 5, for "a corporation of Deleware", each occurrence, read -- a corporation of Massachusetts --.

Signed and sealed this 15th day of November 1960.

(SEAL)
Attest:

KARL H. AXLINE
Attesting Officer

ROBERT C. WATSON
Commissioner of Patents